United States Patent
Kruglick

(10) Patent No.: US 9,043,923 B2
(45) Date of Patent: May 26, 2015

(54) VIRTUAL MACHINE MONITOR (VMM) EXTENSION FOR TIME SHARED ACCELERATOR MANAGEMENT AND SIDE-CHANNEL VULNERABILITY PREVENTION

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 81 days.

(21) Appl. No.: 13/885,160

(22) PCT Filed: Dec. 27, 2012

(86) PCT No.: PCT/US2012/071786
§ 371 (c)(1),
(2) Date: May 13, 2013

(87) PCT Pub. No.: WO2014/105019
PCT Pub. Date: Jul. 3, 2014

(65) Prior Publication Data
US 2014/0189862 A1 Jul. 3, 2014

(51) Int. Cl.
*G06F 21/00* (2013.01)
*G06F 21/55* (2013.01)
*G06F 9/50* (2006.01)

(52) U.S. Cl.
CPC .............. *G06F 21/55* (2013.01); *G06F 21/556* (2013.01); *G06F 9/5027* (2013.01)

(58) Field of Classification Search
CPC ...... G06F 21/53; G06F 9/455; G06F 9/45533; G06F 21/55; G06F 21/556; G06F 21/5027
USPC .......................................................... 726/25
See application file for complete search history.

(56) References Cited

U.S. PATENT DOCUMENTS

| | | | |
|---|---|---|---|
| 2004/0068711 A1* | 4/2004 | Gupta et al. ..................... | 716/18 |
| 2007/0157211 A1* | 7/2007 | Wang et al. ..................... | 719/313 |
| 2007/0198971 A1 | 8/2007 | Dasu et al. | |
| 2011/0055471 A1* | 3/2011 | Thatcher et al. .............. | 711/114 |

(Continued)

FOREIGN PATENT DOCUMENTS

WO 2010151813 A1 12/2010

OTHER PUBLICATIONS

"System C", http://en.wikipedia.org/wiki/SystemC, Last modified on Apr. 6, 2013.

(Continued)

*Primary Examiner* — Yogesh Paliwal
(74) *Attorney, Agent, or Firm* — Turk IP Law, LLC

(57) ABSTRACT

Technologies are presented for automatically generating accelerator code for datacenter users, detecting multiple hardware tenants with overlapping accelerator needs, and managing the accelerator needs of the tenants so that they can share use of programmable accelerator hardware. In some examples, the accelerator code may also be customer supplied. In other examples, a delay that simulates accelerator programming for a user first accessing an accelerator that was virtualized from a pre-existing one may be applied. By simulating the delay, co-location detection (a form of side channel attack) may be prevented.

23 Claims, 8 Drawing Sheets

(56) References Cited

U.S. PATENT DOCUMENTS

2012/0216296 A1* 8/2012 Kidron .......................... 726/28
2012/0239921 A1 9/2012 Fallon

OTHER PUBLICATIONS

"C to HDL"; http://en.wikipedia.org/wiki/C_to_HDL#Example_tools, Last Modified on May 28, 2012.
"Field-programmable gate array"; http://en.wikipedia.org/wiki/Field-programmable_gate_array, Last modified on May 1, 2013.
"MIT Enterprise Forum Start-up Presentation: Nimbix", Slideshare; http://www.slideshare.net/mitdfw/mit-enterprise-forum-startup-presentation-nimbix, Mar. 12, 2012.
"Project-Team RUNTIME, Efficient runtime systems for parallel architectures", Activity Report INRIA, Apr. 2011.
"Startup Claims to SoC in 8-16 Weeks"; http://hardware.slashdot.org/story/12/04/23/2128235/startup-claims-c-code-to-soc-in-8-16-weeks, Posted by Soulskill on Apr. 23, 2012.
Andrews et al., "Achieving Programming Model Abstractions for Reconfigurable Computing", Very Large Scale Integration (VLSI) Systems, IEEE Transactions on 16, No. 1, pp. 34-44, Jan. 2008.
Fornaciari et al., "Virtual FPGAs: Some Steps Behind the Physical Barriers", Mar. 1998.
Goulding et al., "GreenDroid: A Mobile Application Processor for a Future of Dark Silicon", CSAIL Massachusetts Institue of Tecnnology Hot Chips, Aug. 23, 2010.
Gupta et al., "Pegasus: Coordinated Scheduling for Virtualized Accelerator-based Systems", Apr. 2011.
International Search Report filed Dec. 27, 2012, mailed on Feb. 26, 20313.
Kelm et al., "HybridOS: Runtime Support for Reconfigurable Accelerators." In Proceedings of the 16th International ACM/SIGDA Symposium on Field Programmable Gate Arrays, 212-221. ACM, Feb. 2008.
Kulabukhova et al., "Software for Virtual Accelerator Designing", Proceedings of ICALEPCS 2011, Grenoble, France, Oct. 2011.
Shaw et al., "Anton: A Special-Purpose Machine for Molecular Dynamics Simulation", Proc. 34th Annual Int'l Symposium of Computer Architecture (ISCA 07), IEEE CS Press, May 2007.
Swanson et al., "GreenDroid: Exploring the Next Evolution in Smartphone Application Processors", Communications Magazine, IEEE 49, No. 4, pp. 112-114, Apr. 2011.
Tatsubori et al., "A Bytecode Translator for Distributed Execution of "Legacy" Java Software", ECOOP 2001-Object-Oriented Programming, 231-255, Jun. 2001.
Trimberger et al., "A Time-multiplexed FPGA." , In FPGAs for Custom Computing Machines. Proceedings the 5th Annual IEEE Symposium, pp. 22-28, Apr. 1997.
Trimberger et al., "Trusted Design in FPGAs." In Design Automation Conference, 2007. DAC'07. 44th ACM/IEEE, 5-8. IEEE, Jun. 2007.
Venkatesh et al., "Conserving Cores: Reducing the Energy of Mature Computation", ACM SIGPLAN Notices 45, No. 3, Mar. 2010.

* cited by examiner

VIRTUAL MACHINE MONITOR (VMM) EXTENSION FOR TIME SHARED ACCELERATOR MANAGEMENT AND SIDE-CHANNEL VULNERABILITY PREVENTION

CROSS-REFERENCE TO RELATED APPLICATIONS

This application is the National Stage filing under 35 U.S.C §371 of PCT Application Ser. No. PCT/US 12/71786 filed on Dec. 27, 2012. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Accelerators or coprocessors in datacenters may offer a variety of benefits that are driving their implementation in datacenters. Moving frequently used algorithms into hardware may reduce a power to performance ratio by factors of ten or more. The algorithms may be abstracted to allow acceleration of a wide variety of functions. Thus algorithms using hardware acceleration may be along a spectrum of faster and less power with an advantage of 10× or more over software executed on general purpose processors.

Various systems are evolving to take advantage of FPGAs (reconfigurable accelerators) in moving frequently used algorithm into hardware. For example, some operating system changes may support and leverage reconfigurable computing. With the advance in tools for creating accelerators, even high level code may be composed into VHDL or other languages that may be implemented in reconfigurable accelerators. This may allow automated systems to create code and produce accelerator gate arrangements appropriate for an existing program.

Security in FPGAs, where the operational hardware is shared, is still in its early stages. Some systems for delivering encrypted FPGA code may only be read on the target FPGA, which may be useful in trusted design to ensure the gates reach the field intact, but less useful in a datacenter environment where the accelerator hardware may be virtualized and needed to be swapped quickly.

SUMMARY

The present disclosure generally describes technologies for employing a virtual machine monitor (VMM) extension for time shared accelerator management and side-channel vulnerability prevention in a datacenter based service environment.

According to some examples, a method for providing time shared accelerator management may include receiving information associated with a gate array code related to a user instance and determining if an accelerator exists for the gate array code among a plurality of user-independent accelerators. If the accelerator exists, the gate array code may be scheduled for the user instance to execute on the accelerator. If the accelerator does not exist, the gate array code may be assigned to a blank accelerator.

According to other embodiments, a server for providing time shared accelerator management and side-channel attack prevention may include one or more communication modules configured to communicate with components of a datacenter; a memory configured to store instructions; and a processor coupled to the memory and the communication modules, where the processor is configured to execute a virtual machine monitor (VMM) application. The VMM application may receive information associated with a gate array code related to a user instance; determine if an accelerator exists for the gate array code among a plurality of user-independent accelerators; if the accelerator exists, schedule the gate array code for the user instance to execute on the accelerator; and if the accelerator does not exist, assign the gate array code to a blank accelerator.

According to further embodiments, a cloud-based datacenter configured to provide time shared accelerator management and side-channel attack prevention may include a plurality of virtual machines operable to be executed on one or more physical machines; a plurality of hardware accelerators for executing predefined gate array codes; and a datacenter controller. The datacenter controller may receive information associated with a gate array code related to a user instance; determine if an accelerator exists for the gate array code among the plurality of hardware accelerators; if the accelerator exists, schedule the gate array code for the user instance to execute on the accelerator; and if the accelerator does not exist, assign the gate array code to a blank accelerator.

According to yet other examples, a computer readable storage medium with instructions stored thereon, which when executed on one or more computing devices may execute a method for providing time shared accelerator management and side-channel attack prevention. The method may be similar to the method described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
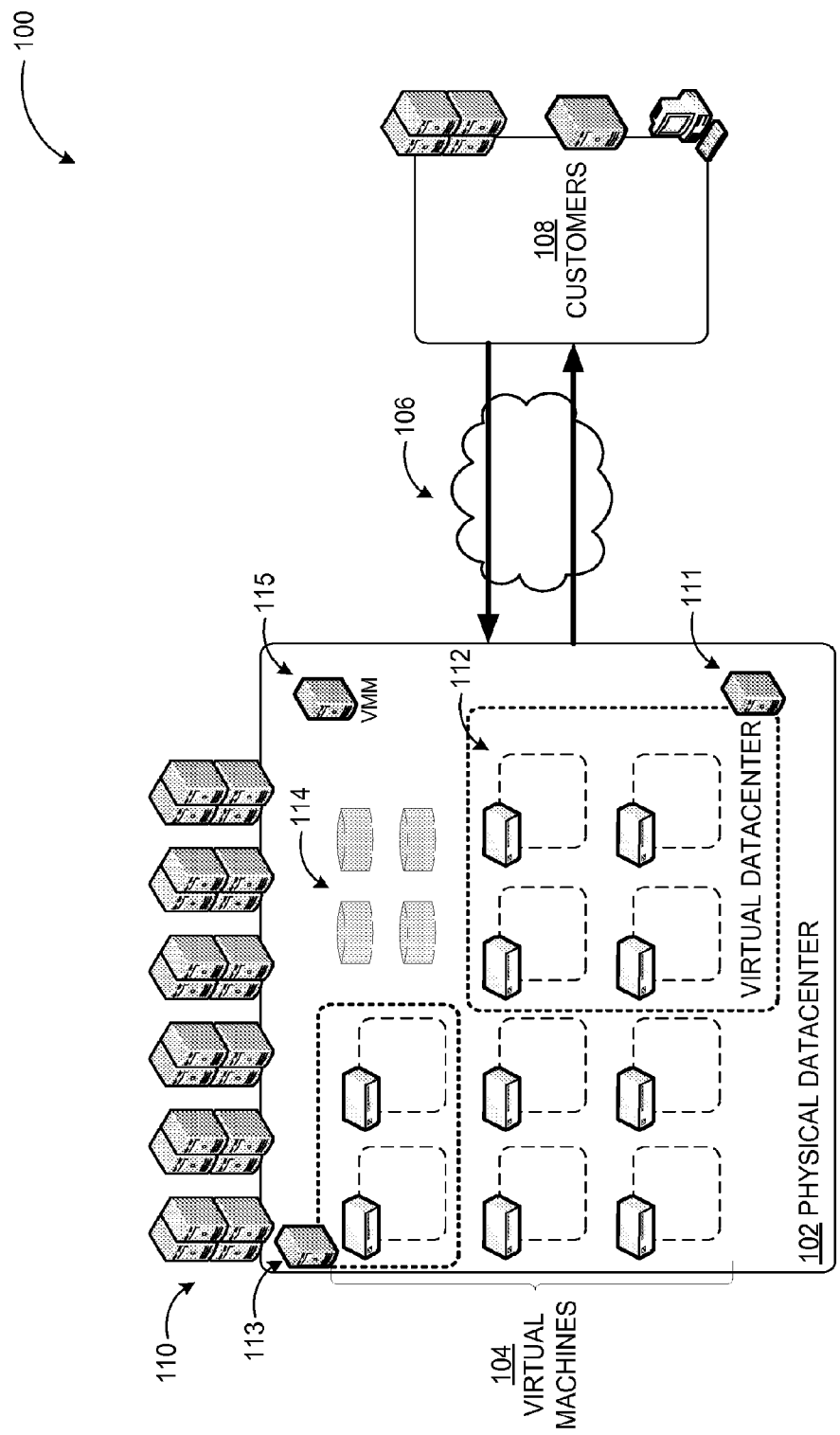
FIG. 1 illustrates an example datacenter based system where time shared accelerator management and side-channel vulnerability prevention may be provided through a VMM extension.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to employing a virtual machine monitor (VMM) extension for time shared accelerator management and side-channel vulnerability prevention in a datacenter based service environment.

Briefly stated, technologies are presented for automatically generating accelerator code for datacenter users, detecting multiple hardware tenants with overlapping accelerator needs, and managing the accelerator needs of the tenants so that they can share use of programmable accelerator hardware. In some examples, the accelerator code may also be customer supplied. In other examples, a delay that simulates accelerator programming for a user first accessing an accelerator that was virtualized from a pre-existing one may be applied. By simulating the delay, co-location detection (a form of side channel attack) may be prevented.

A gate array code, as used herein, refers to machine readable instructions for a hardware processor such as a Field Programmable Gate Array (FPGA) or similar devices to perform predefined actions. A gate array code may be in various forms such as Hardware Description Language (HDL) from a class of computer languages, specification languages, or modeling languages for formal description and design of electronic circuits, and particularly, digital logic. Gate array code may describe a circuit's operation, design, and organization, and tests to verify its operation by means of simulation. The gate array code may apply to any reconfigurable hardware accelerator such as GPU cores with shader inputs, reconfigurable state machines, and similar ones.

FIG. 1 illustrates an example datacenter based system where time shared accelerator management and side-channel vulnerability prevention may be provided through a VMM extension, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a cloud 106.

In some examples, hardware accelerators (e.g., FPGAs) may be employed to execute frequently used portions of code in hardware adding speed and reliability to the datacenter provided services. Where multiple customers use shared portions of code (e.g., service modules such as operating systems, databases, proxies, software based caches, encryption systems, payment module, identification module, shipment module, tracking module, and similar ones), hardware accelerators may be shared among different customers. Some accelerators may have the ability to (may be configured to) swap out and preserve states of modules. The ability to preserve and swap state means that accelerators which can be used by multiple deployments may be virtualized and switched similar to switched general purpose processors.

Virtualized accelerators may need a VMM system such as a virtual machine manager (VMM) 115 for testing incoming accelerators to determine if they are already loaded in the FPGA and to rearrange VM timing in order to take advantage of overlap in accelerator needs. This optimization of resources may open up, however, a security vulnerability where an attacker may use the difference between a compile-initialize-provision delay and a simple virtualization delay to detect whether an accelerator is already running. The attacker may thereby detect co-location with a target by attempting to run accelerators the target uses (or is presumed to use).

A system according to some embodiments may automatically generate accelerator code for datacenter users, detect multiple customers with overlapping accelerator needs, and manage the accelerator needs of the customers so that they can share use of programmable accelerator hardware. To prevent side channel attacks, a delay that simulates accelerator programming for a user first accessing an accelerator that was virtualized from a pre-existing one may be applied.

Figure 2:
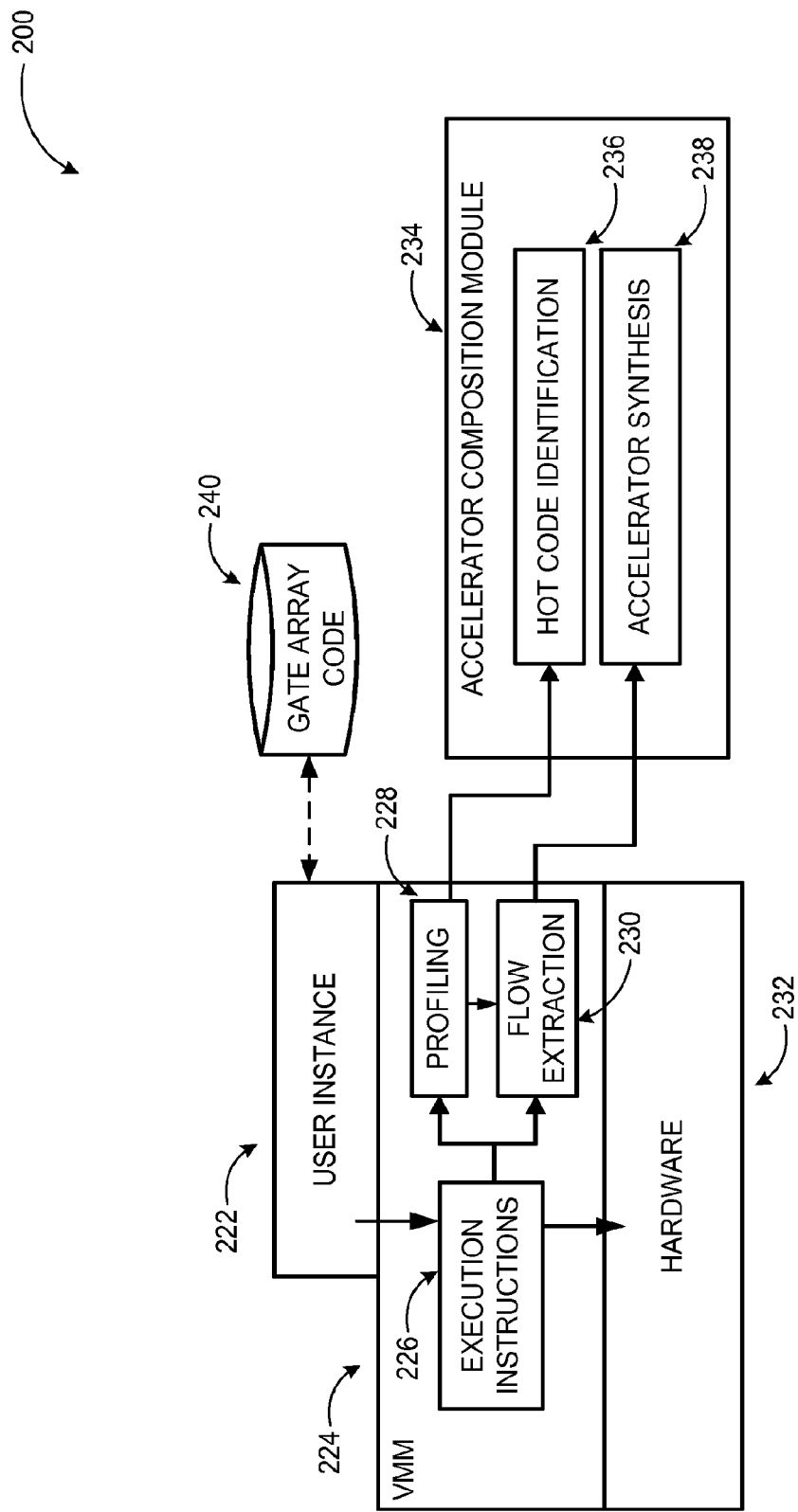
FIG. 2 illustrates an example system for automatically generating accelerators for user instance hot codes and associating user instances with gate array code(s)

FIG. 2 illustrates an example system for automatically generating accelerators for user instance hot codes and associating user instances with gate array code(s), arranged in accordance with at least some embodiments described herein.

User-specific accelerators, which may be provided by the users or generated by a datacenter may enable optimization of services provided by the datacenter through accelerated execution of frequently used portions of code. To generate FPGA code for accelerators at the datacenter, VMMs, which already observe execution instructions, may retrieve algorithms out of execution data through flow extraction. Flow extraction is a technique for determining functional flow trees from compiled bytecode, scripts, or raw code, and is often used for dynamic adaptation of code. Since flow extraction can provide dynamic adaptation level algorithmic analysis, it may also feed into VHDL conversion algorithms.

As shown in a diagram 200, accelerators may be generated for the hot code (portions of code that demand a lot of processing) in a user instance 222. The user instance 222 may reside atop a virtual machine manager (VMM) 224, which itself runs over hardware 232. Execution instructions 226 are typically passed from the user instance 222 to the VMM 224 to the hardware 232 with full access at the VMM 224 level so that the execution instructions 226 can be trapped or modified for virtualization. In order to generate accelerators for the user instance 222, the VMM 224 may apply profiling 228 and flow extraction 230 to the execution instructions 226. The output from the profiling 228 and the flow extraction 230 processes may be sent to an accelerator composition module 234, which may execute hot code identification 236 and accelerator synthesis 238 processes, where the hot code (frequently used code suitable for hardware execution) may be identified and FPGA code generated based on the identified hot code. The accelerator composition module 234 may be executed on the same hardware as the VMM 224 or on different hardware as a datacenter administratively owned process.

The accelerator composition module 234 may output gate array code 240 (or another accelerator format) associated with the user instance 222. The association may be accomplished, for example, via a certificate or administrative record. This may allow a datacenter to generate accelerators that can make a customer's instances run faster and/or with less power consumption without requiring the user to take any action.

Figure 3:
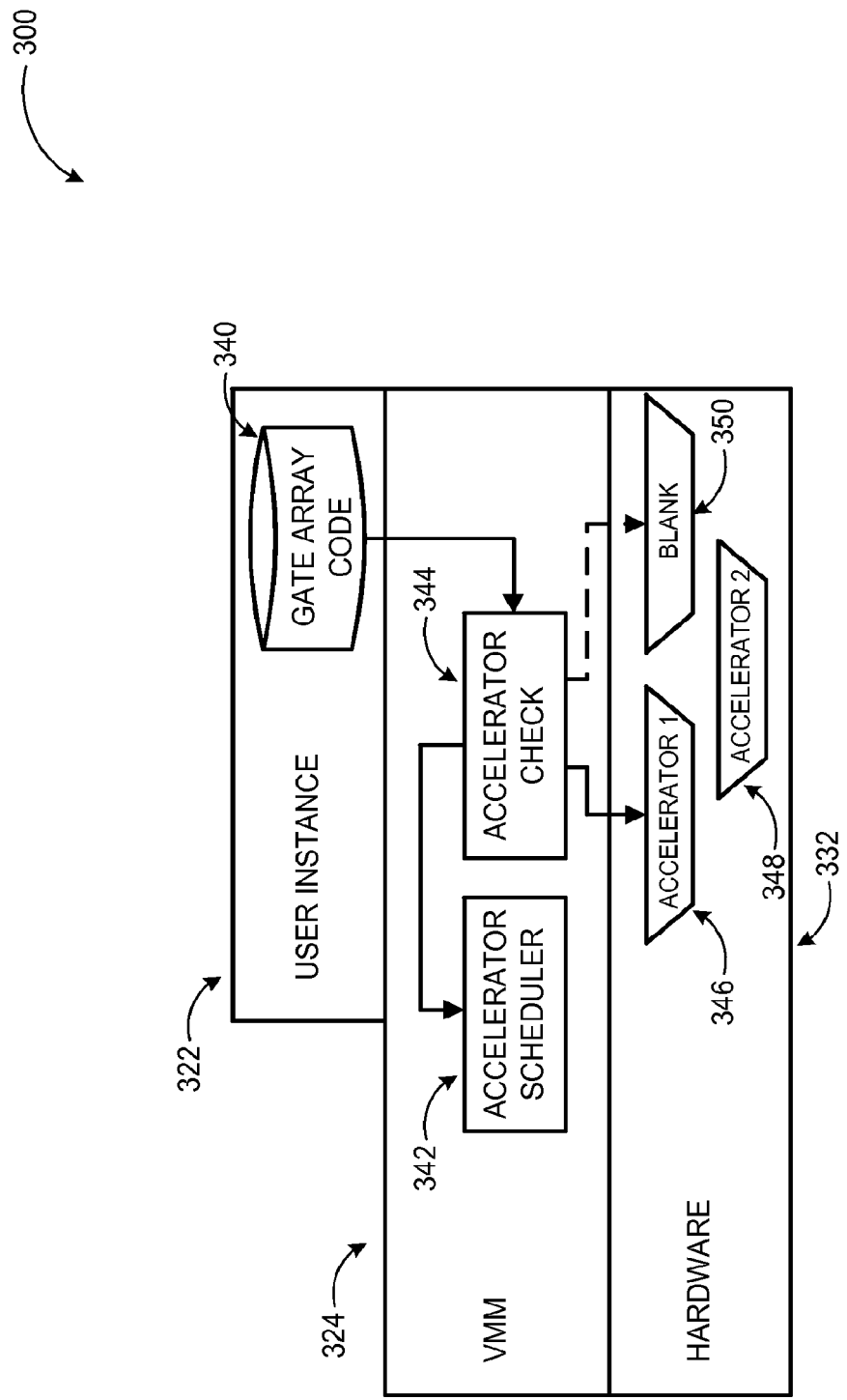
FIG. 3 illustrates another example system for detection of duplicate hardware accelerators and virtualized reuse across multiple users.

FIG. 3 illustrates another example system for detection of duplicate hardware accelerators and virtualized reuse across multiple users, arranged in accordance with at least some embodiments described herein.

In many cases, the hot code in different applications may have overlap, meaning that many applications can use the same accelerators. For example, ZIP and JPEG processing instructions occur in many places. Any service that serves web content is likely to use ZIP for sending text even when it is just an inlining of a few paragraphs. Similarly, viterbi, master command file (mcf), and radix commands form the basis of many different-seeming application codebases as the low level instructions behind the compilers tend toward specific known operations. This means that there may be substantial overlap in the populations of accelerators generated for applications. One optimization approach for a datacenter using accelerators may be to attempt to choose accelerators from a pre-existing library when possible to maximize reuse.

Whether or not the accelerators are specifically drawn from a library, there may likely be many instances where co-located instances may need the same accelerators. Thus, by detecting and taking advantage of such events, more applications may be accelerated at once for any given hardware stack.

In FIG. 3, a diagram 300 depicts detection of duplicate hardware accelerators and virtualized reuse. As shown in the diagram 300, a user instance 322, a VMM 324, and hardware 332 may be arranged similar to FIG. 2 except that the hardware 332 has programmable accelerators 346, 348, and 350 shown for illustration purposes. The user instance 322 may be associated with an accelerator (such as gate array code 340), which may be delivered to the VMM 324 to be implemented in the hardware 332 with programmable accelerators 346, 348, and 350. The VMM 324 may perform an accelerator check 344 such as a deduplication hash on the accelerator gate array code 340 to determine if a similar accelerator is already executing. If the gate array code 340 is new, it may be sent into an available blank accelerator 350. The blank accelerator 350 may just be a geometric region of a shared FPGA, but if the hash check indicates that the accelerator is already running (e.g., as the accelerator 346 or 348), the VMM 324 may virtualize the request by servicing the user instance 322 using the already programmed accelerator(s). In the latter case, the VMM 324 may also update an accelerator scheduler 342 so that, for example, the user instance 322 is set not to overlap with another virtual machine that uses the accelerator 346 or 348. This may be accomplished by, for example, managing the virtual machine switching so that the two users of accelerator 346 or 348 are not in operation at the same time.

Co-locating instances that have similar accelerator needs may increase chip utilization as well as a proportion of processes that are accelerated. Many datacenter virtual machines (VMs) use similar software. So, for example, database servers from different users all co-located with accelerators specifically for that software may produce a highly efficient and high performance user experience. This optimization may continue to be beneficial up until there is too much conventional processor demand to keep the VMs from overlapping, which could cause conflicts in the accelerators. At the opposite end of the provisioning spectrum, there may be a new optimum for processes that have minimal accelerator sharing as they may save substantial power by being spread out across many servers to make maximum use of accelerators.

Figure 4:
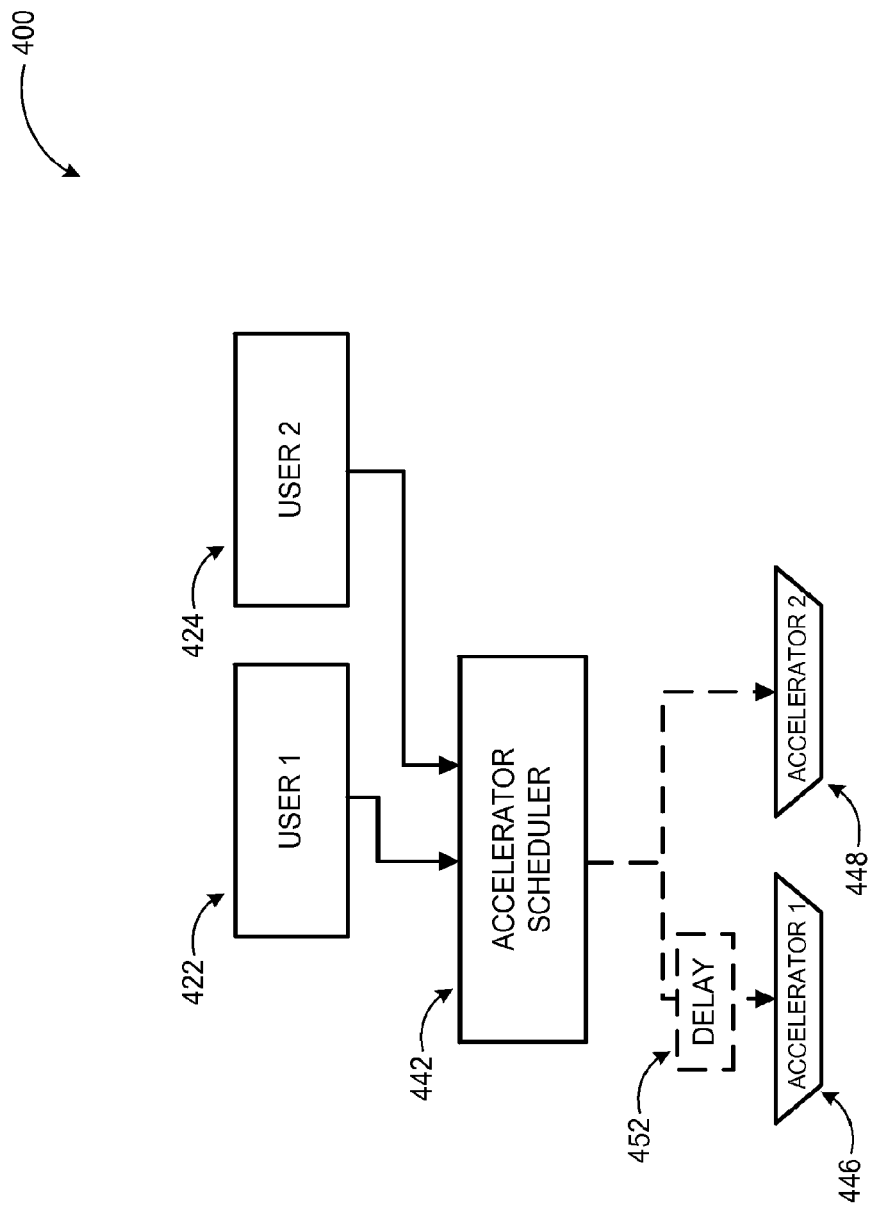
FIG. 4 illustrates an example of side-channel attack prevention through introduced delay in accelerator scheduling.

FIG. 4 illustrates an example of side-channel attack prevention through introduced delay in accelerator scheduling, arranged in accordance with at least some embodiments described herein.

As shown in a diagram 400, multiple users (e.g., user-1 422 and user-2 424) may be assigned to an accelerator-1 446 and an accelerator-2 448 by an accelerator scheduler 442. The accelerators may be physically adjacent on an FPGA and allow a malicious user to use side channel attacks. In some examples, a delay 452 may be introduced to prevent such attacks from being successful.

A successful side channel attack involves three steps: cloud cartography to determine how to launch instances that have a chance of co-locating with a target, co-location detection to determine which instances have successfully landed on the same hardware as a target, and the side channel attack in which a property of shared resources may be used to extract information. The accelerator duplicate checking and virtualization discussed above may result in a security risk because an attacker may submit an accelerator duplicating one associated with a target and may recognize by the speed of availability that the accelerator was not actually programmed and was thus pre-existing. To prevent this kind of attack the accelerator scheduler 442 may include a simulator to apply the delay 452 that simulates accelerator programming on a user first accessing an accelerator that was virtualized from a pre-existing one. By simulating this delay, a new user cannot determine whether an accelerator is pre-existing and the co-location detection is prevented.

In some examples, the automated generation of the gate array code (or any other accelerator type) may result in faster and/or lower power operations of a user instance. Thus, a datacenter may internally keep track of when the gate array code is generated and change provisioning strategies for the user instance once the accelerator is available and associated with the user instance. For example, the instance may be more likely to be assigned to a system with accelerator support once the accelerator is available. In other examples, the amount of processor or other resources allotted to a user instance may be reduced once the accelerator is available as long as the user instance is able to also use an accelerator, as the accelerator may more than make up for any resource reduction. This means that a datacenter may be able to raise their margins on continuing customers once the user instance is well understood and accelerators are generated or available.

Figure 5:
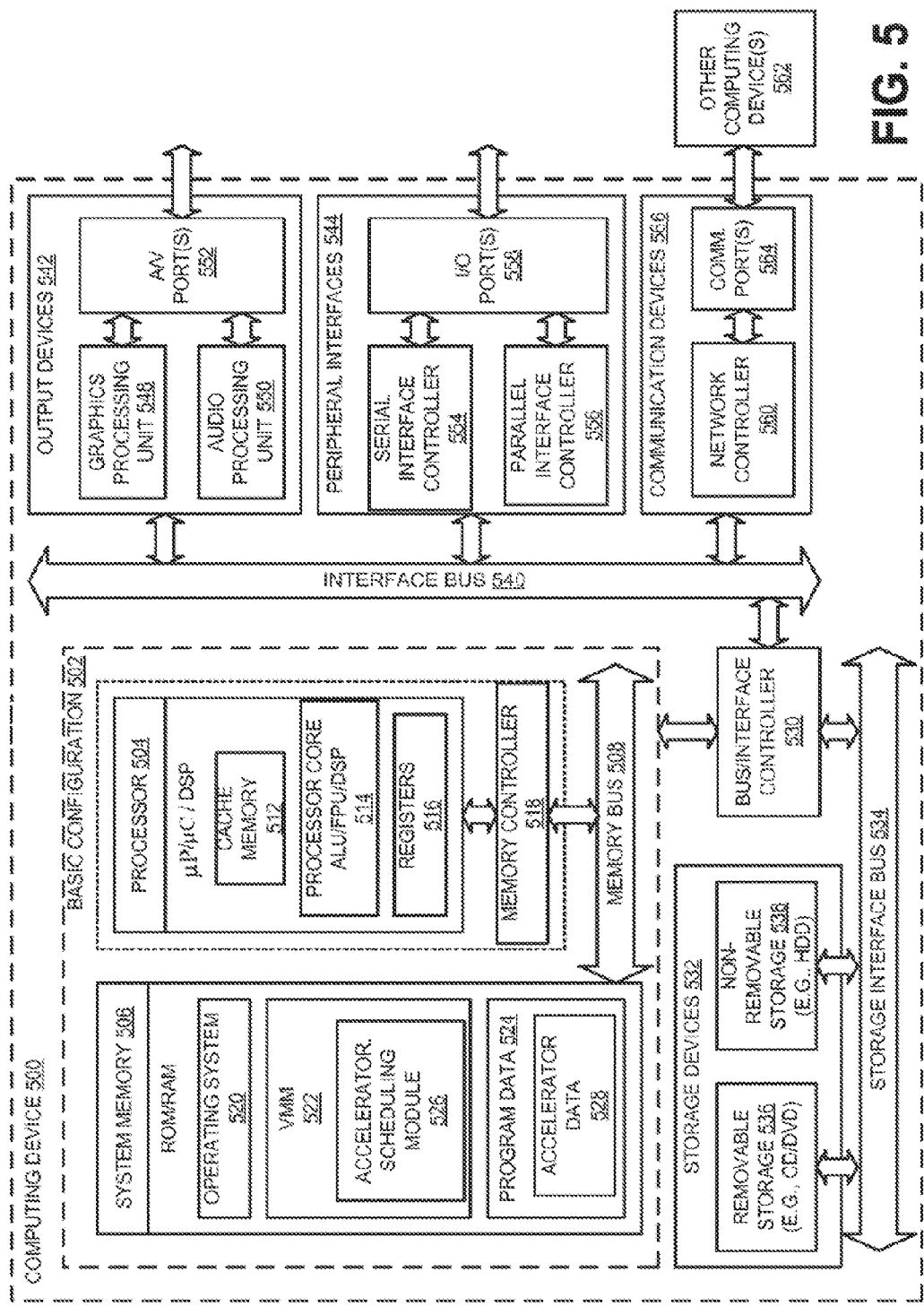
FIG. 5 illustrates a general purpose computing device, which may be used to provide time shared accelerator management and side-channel vulnerability prevention.

FIG. 5 illustrates a general purpose computing device, which may be used to provide time shared accelerator management and side-channel vulnerability prevention, arranged in accordance with at least some embodiments described herein.

For example, the computing device 500 may be used to manage hardware accelerators in a datacenter environment as described herein. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (μP), a microcontroller (μC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a VMM application 522, and program data 524. The VMM application 522 may include an accelerator scheduling module 526 to manage shared hardware accelerators in a datacenter as described herein. The program data 524 may include, among other data, accelerator data 528 or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for managing compound certification for assurance without revealing infrastructure. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 6:
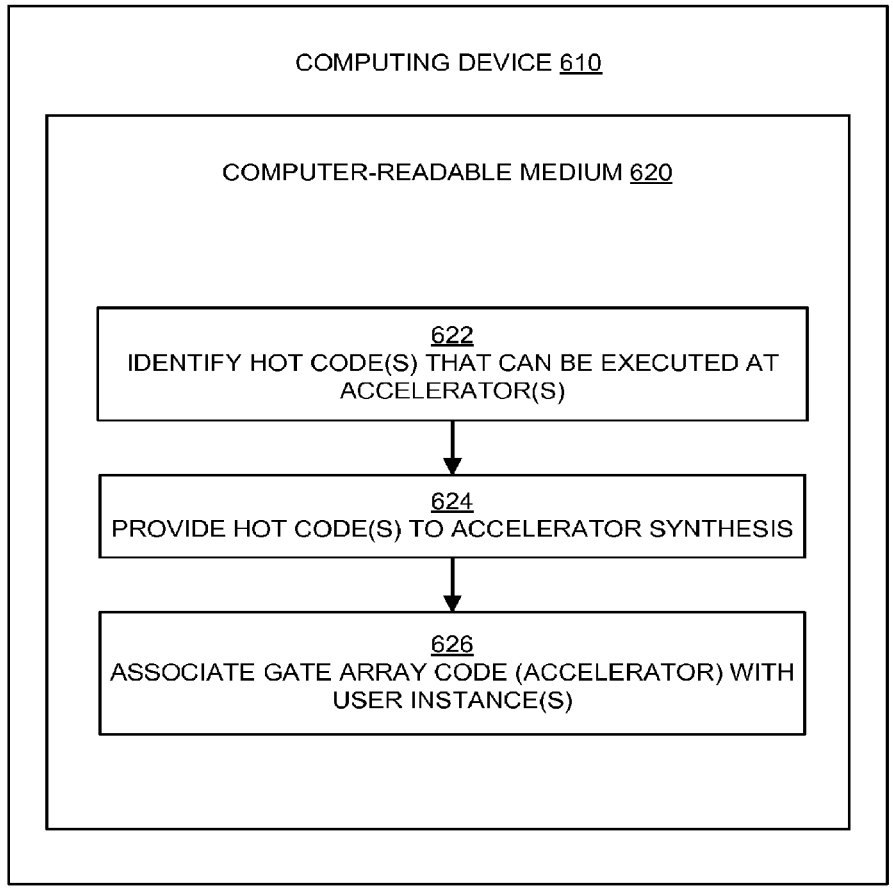
FIG. 6 is a flow diagram illustrating an example method for automatically generating accelerators for user instance hot codes and associating user instances with gate array code(s)

FIG. 6 is a flow diagram illustrating an example method for automatically generating accelerators for user instance hot codes and associating user instances with gate array code(s), arranged in accordance with at least some embodiments described herein.

Example methods may include one or more operations, functions or actions as illustrated by one or more of blocks 622, 624, and/or 626, and may in some embodiments be performed by a computing device such as the computing device 500 in FIG. 5. The operations described in the blocks 622-626 may also be stored as computer-executable instructions in a computer-readable medium such as a computer-readable medium 620 of a computing device 610.

An example process for automatically generating accelerators for user instance hot codes may begin with block 622, "IDENTIFY HOT CODE(S) THAT CAN BE EXECUTED AT ACCELERATOR(S)", where the accelerator composition module 234 may identify hot code(s) which may be candidates for hardware based acceleration.

Block 622 may be followed by block 624, "PROVIDE HOT CODE(S) TO ACCELERATOR SYNTHESIS", where the accelerator composition module 234 may provide the identified hot code(s) to an accelerator synthesis module for generation of a hardware accelerator dedicated to the identified hot code(s). A gate array code may be generated as part of the operations in block 624.

Block 624 may be followed by block 626, "ASSOCIATE GATE ARRAY CODE (ACCELERATOR) WITH USER INSTANCE(S)", where the generated gate array code may be associated with a user instance and stored in a data store associated with the datacenter.

Figure 7:
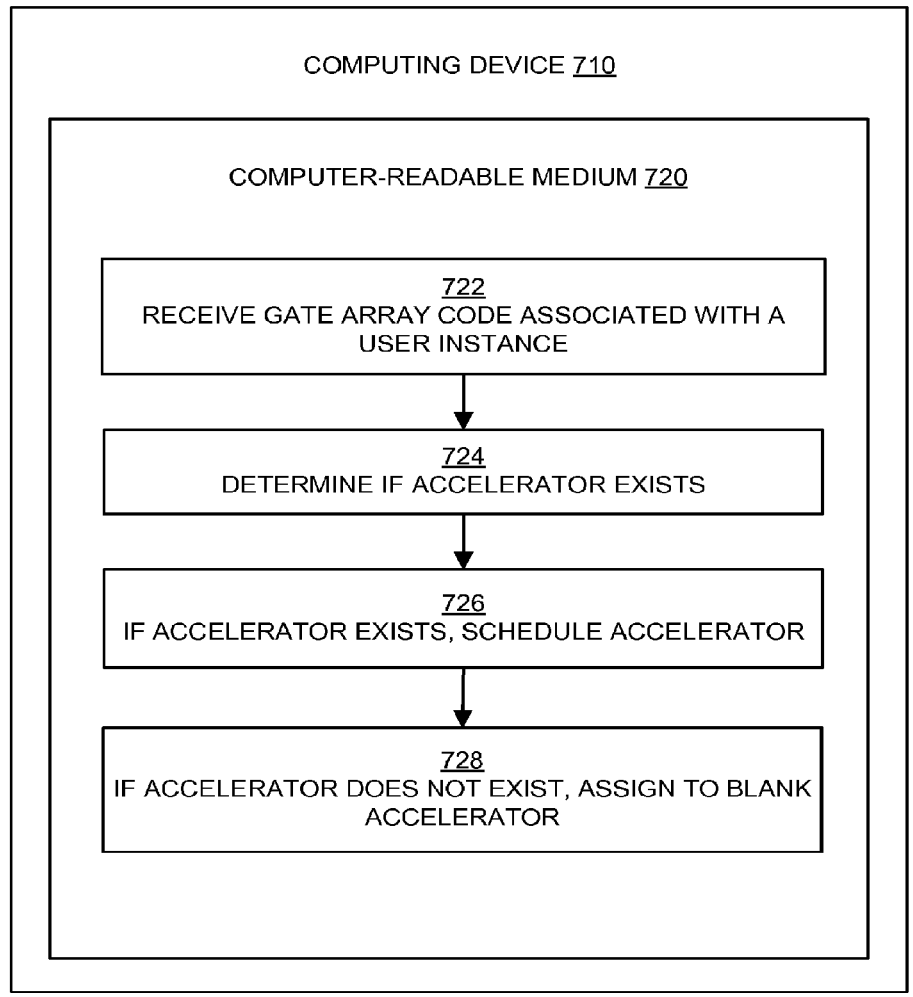
FIG. 7 is a flow diagram illustrating an example method for detecting duplicate hardware accelerators and virtualized reuse across multiple users.

FIG. 7 is a flow diagram illustrating an example method for detecting duplicate hardware accelerators and virtualized reuse across multiple users, arranged in accordance with at least some embodiments described herein.

An example process for detecting duplicate hardware accelerators and virtualized reuse across multiple users may begin with block 722, "RECEIVE GATE ARRAY CODE ASSOCIATED WITH A USER INSTANCE", where the accelerator check module 344 may receive gate array code associated with a user instance 322 from a gate array code store 340.

Block 722 may be followed by block 724, "DETERMINE IF ACCELERATOR EXISTS", where the accelerator check module 344 may determine whether there is an existing accelerator to which the gate array code may be assigned.

Block 724 may be followed by block 726, "IF ACCELERATOR EXISTS, SCHEDULE ACCELERATOR", where the accelerator scheduler module 342 may assign the gate array code to an existing accelerator that can handle the gate array code.

Otherwise, block 724 may be followed by block 728, "IF ACCELERATOR DOES NOT EXIST, ASSIGN TO BLANK ACCELERATOR", where the accelerator scheduler module 342 may assign the gate array code to a blank accelerator.

The processes 600 and 700 may be implemented with additional or fewer operations or in other orders than discussed above.

Figure 8:
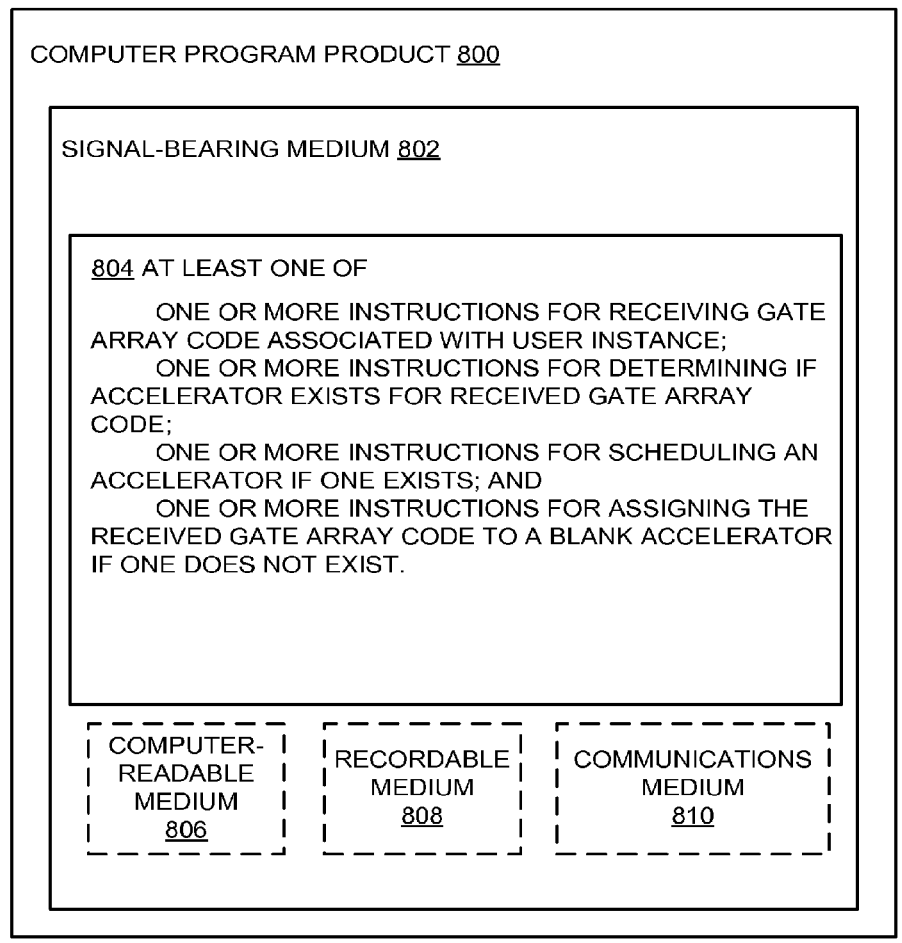
FIG. 8 illustrates a block diagram of an example computer program product; all arranged in accordance with at least some embodiments described herein.

FIG. 8 illustrates a block diagram of an example computer program product, arranged in accordance with at least some embodiments described herein.

In some examples, as shown in FIG. 8, the computer program product 800 may include a signal bearing medium 802 that may also include one or more machine readable instructions 804 that, when executed by, for example, a processor, may provide the functionality described herein. Thus, for example, referring to the processor 504 in FIG. 5, the VMM application 522 or the accelerator module 526 may undertake one or more of the tasks shown in FIG. 8 in response to the instructions 804 conveyed to the processor 504 by the medium 802 to perform actions associated with managing hardware accelerators in a datacenter environment as described herein. Some of those instructions may include, for example, receiving gate array code associated with a user instance, determining if an accelerator exists for the received gate array code, scheduling an accelerator if one exists, and assigning the received gate array code to a blank accelerator if one does not exist, according to some embodiments described herein.

In some implementations, the signal bearing medium 802 depicted in FIG. 8 may encompass a computer-readable medium 806, such as, but not limited to, a hard disk drive, a solid state drive, a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the program product 800 may be conveyed to one or more modules of the processor 804 by an RF signal bearing medium, where the signal bearing medium 802 is conveyed by the wireless communications medium 810 (e.g., a wireless communications medium conforming with the IEEE 802.11 standard).

According to some examples, a method for providing time shared accelerator management may include receiving information associated with a gate array code related to a user instance and determining if an accelerator exists for the gate array code among a plurality of user-independent accelerators. If the accelerator exists, the gate array code may be scheduled for the user instance to execute on the accelerator. If the accelerator does not exist, the gate array code may be assigned to a blank accelerator.

According to other examples, the information may be an identifier of the gate array code or the gate array code itself. The method may further include determining whether the accelerator exists by performing an identifier comparison, a hash check, or a code comparison. The hash may be a deduplication hash on the gate array code. The method may also include virtualizing an execution request associated with the gate array code by servicing the user instance using the already programmed accelerator if the accelerator exists or updating an accelerator scheduler so that the user instance is set not to overlap with another virtual machine that uses the accelerator. The user-independent accelerators may be user provided, third party provided, or datacenter generated.

According to further examples, the method may include identifying a hot code portion of user instructions that can be executed at an accelerator; providing the hot code to an accelerator synthesis module; and associating synthesized gate array code with the user instance. The method may also include monitoring execution instructions; employing flow extraction to provide a dynamic adaptation level algorithmic analysis; and employing the analysis results in hardware description language conversion for gate array programming. The method may further include profiling one or more of execution time, network access time, and memory access time associated with each execution instruction, associating the synthesized gate array code with the user instance via one of a certificate or an administrative record, applying a predefined delay to a user instance accessing an accelerator virtualized from a pre-existing accelerator for the first time, or the delay to simulate accelerator programming for the user instance's first access of a blank accelerator.

According to other embodiments, a server for providing time shared accelerator management and side-channel attack prevention may include one or more communication modules configured to communicate with components of a datacenter; a memory configured to store instructions; and a processor coupled to the memory and the communication modules, where the processor is configured to execute a virtual machine monitor (VMM) application. The VMM application may receive information associated with a gate array code related to a user instance; determine if an accelerator exists for the gate array code among a plurality of user-independent accelerators; if the accelerator exists, schedule the gate array code for the user instance to execute on the accelerator; and if the accelerator does not exist, assign the gate array code to a blank accelerator.

According to some examples, the information may be an identifier of the gate array code or the gate array code itself. The VMM application may also determine whether the accelerator exists by performing an identifier comparison, a hash check, or a code comparison. The hash may be a deduplication hash on the gate array code. The VMM application may be further configured to virtualize an execution request associated with the gate array code by servicing the user instance using the already programmed accelerator if the accelerator exists. The VMM application may further update an accelerator scheduler so that the user instance is set not to overlap with another virtual machine that uses the accelerator. The user-independent accelerators may be user provided, third party provided, or datacenter generated.

According to other examples, the server may also include an accelerator composition module, which may identify a hot code portion of user instructions that can be executed at an accelerator; provide the hot code to an accelerator synthesis module; and associate synthesized gate array code with the user instance. The VMM application may further monitor execution instructions; and employ flow extraction to provide a dynamic adaptation level algorithmic analysis. The accelerator composition module may also employ the analysis results in hardware description language conversion for gate array programming.

According to yet other examples, the VMM application may profile one or more of execution time, network access time, and memory access time associated with each execution instruction. The accelerator composition module may associate the synthesized gate array code with the user instance via a certificate or an administrative record. The VMM application may also apply a predefined delay to a user instance accessing an accelerator virtualized from a pre-existing accelerator for the first time and select the delay to simulate accelerator programming for the user instance's first access of a blank accelerator.

According to further embodiments, a cloud-based datacenter configured to provide time shared accelerator management and side-channel attack prevention may include a plurality of virtual machines operable to be executed on one or more physical machines; a plurality of hardware accelerators for executing predefined gate array codes; and a datacenter controller. The datacenter controller may receive information associated with a gate array code related to a user instance; determine if an accelerator exists for the gate array code among the plurality of hardware accelerators; if the accelerator exists, schedule the gate array code for the user instance to execute on the accelerator; and if the accelerator does not exist, assign the gate array code to a blank accelerator.

According to other examples, the information may be an identifier of the gate array code or the gate array code itself. The datacenter controller may further determine whether the accelerator exists by performing an identifier comparison, a hash check, or a code comparison. The hash may be a deduplication hash on the gate array code. The datacenter controller may also virtualize an execution request associated with the gate array code by servicing the user instance using the already programmed accelerator if the accelerator exists or update an accelerator scheduler so that the user instance is set not to overlap with another virtual machine that uses the accelerator. The hardware accelerators may be user provided, third party provided, or datacenter generated.

According to further examples, an accelerator composition service may identify a hot code portion of user instructions that can be executed at an accelerator; provide the hot code to an accelerator synthesis module; and associate synthesized gate array code with the user instance. The datacenter controller may monitor execution instructions; and employ flow extraction to provide a dynamic adaptation level algorithmic analysis, while the accelerator composition service may employ the analysis results in hardware description language conversion for gate array programming.

According to some examples, the datacenter controller may profile one or more of execution time, network access time, and memory access time associated with a group of execution instructions. The accelerator composition service may associate the synthesized gate array code with the user instance via a certificate or an administrative record. The datacenter controller may apply a predefined delay to a user instance accessing an accelerator virtualized from a pre-existing accelerator for the first time. The datacenter controller may select the delay to simulate accelerator programming for the user instance's first access of a blank accelerator. The hardware accelerators may be Field Programmable Gate Array (FPGA) accelerators.

According to yet other examples, a computer readable storage medium with instructions stored thereon, which when executed on one or more computing devices may execute a method for providing time shared accelerator management and side-channel attack prevention. The method may be similar to the method described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide time shared accelerator management, the method comprising:
   receiving information associated with a gate array code related to a user instance;
   determining if an accelerator exists for the gate array code among a plurality of accelerators;
   responsive to determination that the accelerator exists, scheduling the gate array code for the user instance to execute on the accelerator and applying a predefined delay to the user instance accessing the accelerator virtualized from a pre-existing accelerator for a first time, wherein the application of the predefined delay to the user instance simulates accelerator programming to prevent an attacking user from determining whether the accelerator is pre-existing such that a co-location detection is prevented; and
   responsive to determination that the accelerator does not exist, assigning the gate array code to a blank accelerator.

2. The method according to claim 1, wherein the information is one of an identifier of the gate array code or the gate array code itself.

3. The method according to claim 1, further comprising determining whether the accelerator exists by performing one of an identifier comparison, a hash check, or a code comparison.

4. The method according to claim 3, wherein the hash is a deduplication hash on the gate array code.

5. The method according to claim 1, further comprising virtualizing an execution request associated with the gate array code by servicing the user instance using an already programmed accelerator if the accelerator exists.

6. The method according to claim 5, further comprising updating an accelerator scheduler so that the user instance is set not to overlap with another virtual machine that uses the accelerator.

7. The method according to claim 1, wherein the plurality of accelerators are one of user provided, third party provided, or datacenter generated.

8. The method according to claim 7, further comprising:
   identifying a hot code portion of user instructions that can be executed at an accelerator;
   providing the hot code to an accelerator synthesis module; and
   associating synthesized gate array code with the user instance.

9. The method according to claim 8, further comprising:
   monitoring execution instructions;
   employing flow extraction to provide a dynamic adaptation level algorithmic analysis; and
   employing analysis results in hardware description language conversion for gate array programming.

10. The method according to claim 8, further comprising:
    profiling one or more of execution time, network access time, and memory access time associated with execution instructions.

11. The method according to claim 8, further comprising associating the synthesized gate array code with the user instance via one of a certificate or an administrative record.

12. A server to provide time shared accelerator management and side-channel attack prevention, the server comprising:
    one or more communication modules configured to communicate with components of a datacenter;
    a memory configured to store instructions; and
    a processor coupled to the memory and the communication modules, the processor configured to execute a virtual machine monitor (VMM) application, wherein the VMM application is configured to:
      receive information associated with a gate array code related to a user instance;
      determine if an accelerator exists for the gate array code among a plurality of user-independent accelerators;
      responsive to determination that the accelerator exists, schedule the gate array code for the user instance to execute on the accelerator and apply a predefined delay to the user instance accessing the accelerator virtualized from a pre-existing accelerator for a first time, wherein the application of the predefined delay to the user instance simulates accelerator programming to prevent an attacking user from determining whether the accelerator is pre-existing such that a co-location detection is prevented; and
      responsive to determination that the accelerator does not exist, assign the gate array code to a blank accelerator.

13. The server according to claim 12, wherein the VMM application is further configured to determine whether the accelerator exists by performing one of an identifier comparison, a hash check, or a code comparison.

14. The server according to claim 12, wherein VMM application is further configured to virtualize an execution request associated with the gate array code by servicing the user instance using an already programmed accelerator if the accelerator exists.

15. The server according to claim 12, wherein the plurality of user-independent accelerators are one of user provided, third party provided, or datacenter generated.

16. The server according to claim 15, further comprising an accelerator composition module configured to:
    identify a hot code portion of user instructions that can be executed at an accelerator;
    provide the hot code to an accelerator synthesis module; and
    associate synthesized gate array code with the user instance.

17. The server according to claim 16, wherein the VMM application is further configured to:
  monitor execution instructions; and
  employ flow extraction to provide a dynamic adaptation level algorithmic analysis; and
the accelerator composition module is further configured to:
  employ analysis results in hardware description language conversion for gate array programming.

18. A cloud-based datacenter configured to provide time shared accelerator management and side-channel attack prevention, the datacenter comprising:
  a plurality of virtual machines operable to be executed on one or more physical machines;
  a plurality of hardware accelerators for executing pre-defined gate array codes; and
  a datacenter controller configured to:
    receive information associated with a gate array code related to a user instance;
    determine if an accelerator exists for the gate array code among the plurality of hardware accelerators;
    responsive to determination that the accelerator exists, schedule the gate array code for the user instance to execute on the accelerator and apply a predefined delay to the user instance accessing the accelerator virtualized from a pre-existing accelerator for a first time, wherein the application of the predefined delay to the user instance simulates accelerator programming to prevent an attacking user from determining whether the accelerator is pre-existing such that a co-location detection is prevented; and
    responsive to determination that the accelerator does not exist, assign the gate array code to a blank accelerator.

19. The datacenter according to claim 18, wherein the datacenter controller is further configured to determine whether the accelerator exists by performing one of an identifier comparison, a hash check, or a code comparison.

20. The datacenter according to claim 18, wherein datacenter controller is further configured to virtualize an execution request associated with the gate array code by servicing the user instance using an already programmed accelerator if the accelerator exists.

21. The datacenter according to claim 18, wherein the plurality of hardware accelerators are one of user provided, third party provided, or datacenter generated.

22. The datacenter according to claim 21, further comprising an accelerator composition service configured to:
  identify a hot code portion of user instructions that can be executed at an accelerator;
  provide the hot code to an accelerator synthesis module; and
  associate synthesized gate array code with the user instance.

23. The datacenter according to claim 18, wherein the plurality of hardware accelerators are Field Programmable Gate Array (FPGA) accelerators.

* * * * *

UNITED STATES PATENT AND TRADEMARK OFFICE
CERTIFICATE OF CORRECTION

PATENT NO. : 9,043,923 B2  Page 1 of 1
APPLICATION NO. : 13/885160
DATED : May 26, 2015
INVENTOR(S) : Kruglick It is certified that error appears in the above-identified patent and that said Letters Patent is hereby corrected as shown below:

On the title page item 56

On Page 2, under "OTHER PUBLICATIONS", in Column 1, Lines 19-20, delete "CSAIL Massachusetts Institue of Tecnnology Hot Chips," and insert
-- CSAIL, Massachusetts Institute of Technology, Hot Chips 22, --, therefor.

On Page 2, under "OTHER PUBLICATIONS", in Column 2, Line 4, delete "20313." and insert -- 2013. --, therefor.

On Page 2, under "OTHER PUBLICATIONS", in Column 2, Line 16, delete "pp. 112-114," and insert -- pp. 112-119, --, therefor.

On Page 2, under "OTHER PUBLICATIONS", in Column 2, Line 26, delete "Computation"," and insert -- Computations", --, therefor.

In the specification

In Column 1, Line 11, delete "§371" and insert -- § 371 --, therefor.

Signed and Sealed this
Twentieth Day of October, 2015

Michelle K. Lee
*Director of the United States Patent and Trademark Office*